Sept. 12, 1950     J. A. LAUDIEN     2,522,182
SAWDUST REMOVING ATTACHMENT FOR HANDSAWS
Filed June 20, 1949
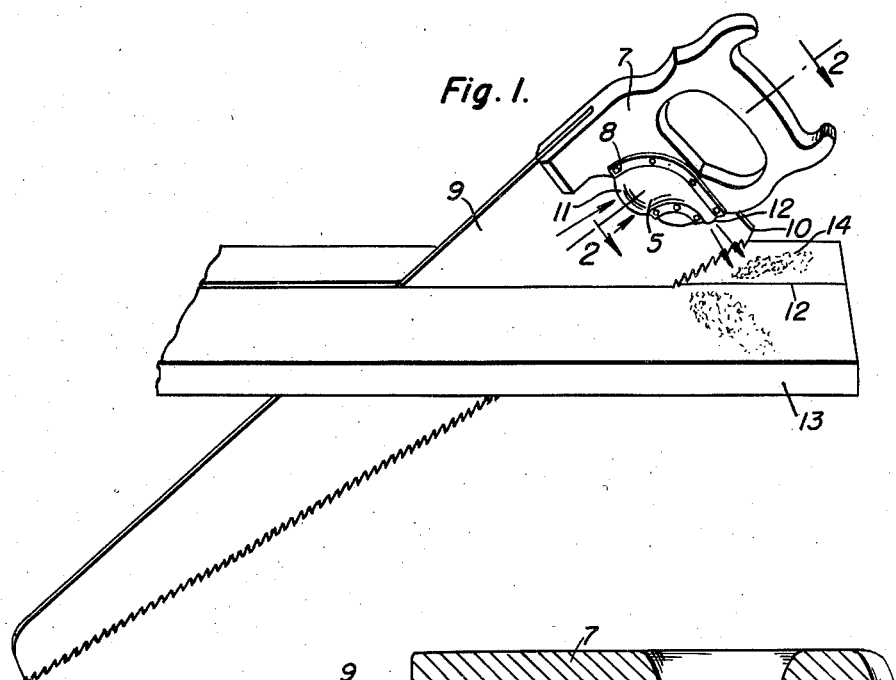
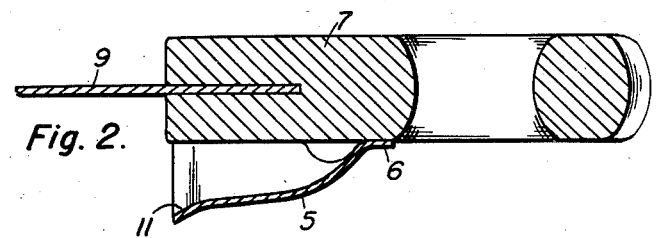
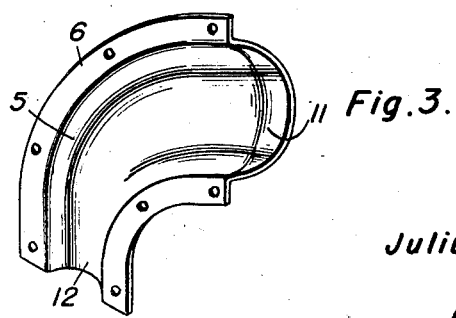
Inventor
Julius A. Laudien
By *Clarence A. O'Brien
and Harvey B. Jacobson*
Attorneys Patented Sept. 12, 1950

2,522,182

UNITED STATES PATENT OFFICE 2,522,182

SAWDUST REMOVING ATTACHMENT FOR HANDSAWS

Julius A. Laudien, Gary, Ind.

Application June 20, 1949, Serial No. 100,118

3 Claims. (Cl. 145—35)

1

The present invention relates to new and useful improvements in handsaws and more particularly to a sawdust removing attachment for blowing the sawdust away from the marked line along which the cut is being made so that said line will be plainly visible at all times.

An important object of the invention is to provide a blowing attachment of this character which is attached to the handle of a saw and causing a draft of air to be blown on the surface of the work along the line of the saw cut to remove accumulation of sawdust therefrom.

A further object of the invention is to provide a blowing attachment of this character which is actuated solely by the motion of the saw when in use.

A still further object is to provide a device of this character of simple and practical construction, which is efficient and reliable in operation, relatively inexpensive to manufacture, which may be easily and quickly installed in operative position on the saw without necessitating any changes or alterations in the construction thereof and which at the same time is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is an enlarged fragmentary longitudinal sectional view taken on a line 2—2 of Figure 1, and Figure 3 is a perspective view of the inside of the blower removed from the saw.

Referring now to the drawing in detail wherein for the purpose of illustration I have disclosed a preferred embodiment of the invention, the numeral 5 designates an arcuate channel member having attaching flanges 6 at its side edges for attaching the open side of the channel member to one side of a saw handle 7 by means of suitable fasteners 8 to position one end of the channel member 5 in a forwardly facing substantially horizontal position with respect to a saw 9 and with the rear end of the channel member 5 curved downwardly and terminating adjacent the saw teeth 10 at the rear end of the saw.

The front upper end of channel member 5 is flared as shown at 11 and and the channel member tapers toward its lower rear end to provide a restricted discharge nozzle end 12.

In the operation of the device, one of the channel members 5 may be secured to either or both sides of saw handle 7 in the position as shown in Figures 1 and 2 of the drawings and a forward movement of the saw during the cutting action will admit air into the flared throat end 11 of the channel member 5, the reduced discharge end 12 of the channel member causing the air to be compressed therein for discharge of the air under pressure in a downward direction along the saw line 12 of lumber 13 to blow the sawdust 14 created by the sawing action from the saw line to thus keep the saw line free from accumulation of sawdust.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A dust removing attachment for handsaws comprising an arcuate channel member secured with the open side of the channel positioned against one side of a saw handle to form an air passage through the channel member, one end of the channel member facing in a forward direction and into which air enters by a forward motion of the saw, and the other end of the channel member facing downwardly to direct air passing therethrough onto work in the region of a saw cut made by the saw.

2. A dust removing attachment for handsaws comprising an attaching plate positioned at one side of a saw handle, and an arcuate air passage formed in the plate and having a forwardly facing opening into which air enters by a forward motion of the saw, and a downwardly facing discharge opening to direct air passing through the passage onto work in the region of a saw cut made by the saw.

3. A dust removing attachment for handsaws comprising an attaching plate positioned at one side of a saw handle, and an arcuate air passage formed at the confronting side of the plate and having a flared forwardly facing opening into which air enters by a forward motion of the saw, and a downwardly facing tapering opening at the rear end of the passage for directing air discharged therefrom onto work in the region of a saw cut made by the saw.

JULIUS A. LAUDIEN.

No references cited.